July 11, 1933.  P. A. MASKE  1,918,049
OIL DISPENSING DEVICE
Filed Aug. 29, 1932
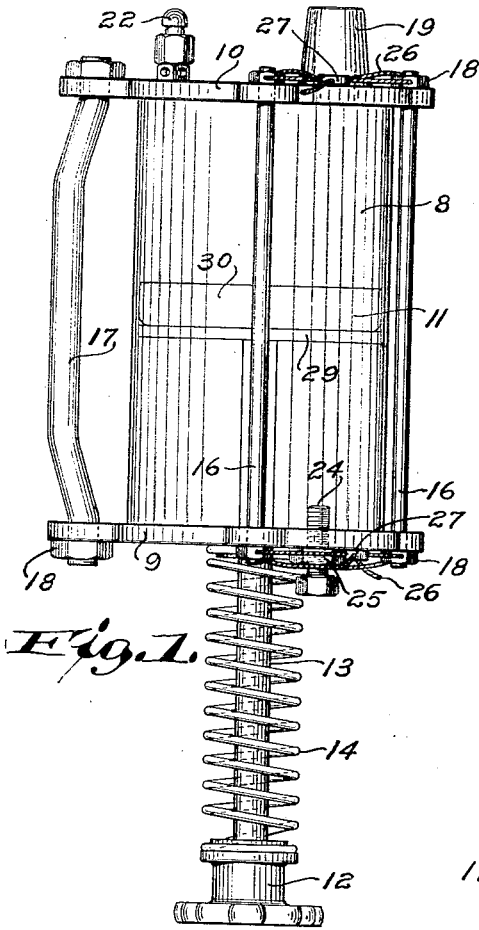
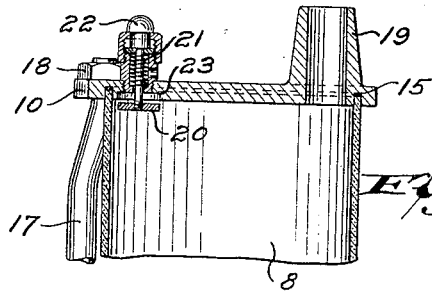
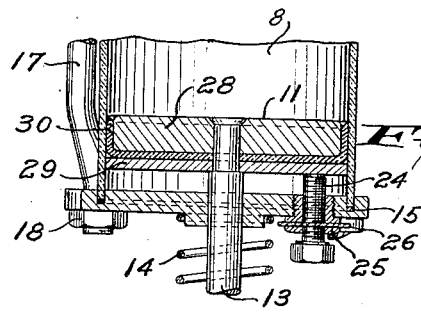
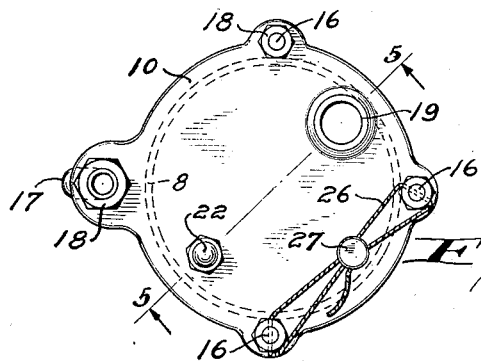
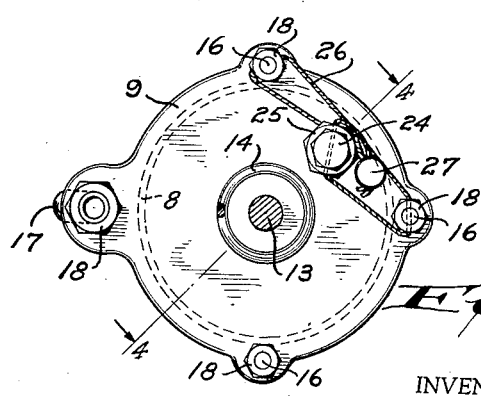
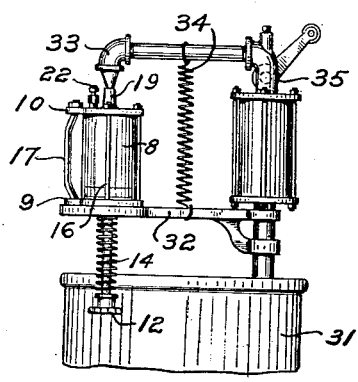
INVENTOR.
P. A. Maske
BY Morsell, Lieber & Morsell
ATTORNEYS.

Patented July 11, 1933

1,918,049

UNITED STATES PATENT OFFICE

PAUL A. MASKE, OF GRAFTON, WISCONSIN

OIL DISPENSING DEVICE

Application filed August 29, 1932. Serial No. 630,760.

The present invention relates in general to improvements in the art of dispensing liquids, and relates more specifically to improvements in the construction and operation of devices for measuring and dispensing batches of heavy oil or the like.

Generally defined, an object of the invention is to provide a new and useful oil dispensing device which is simple in construction and efficient in operation.

It is common practice in the dispensing of lubricating oil to the automobile trade, to utilize either of two types of standard dispensing vessels, namely, the metal liquid measure, or the transparent oil bottle. The metal liquid measure consists of an open topped tin can having a spout at one side of the top and a handle opposite the spout, and this container should bear one or more graduations indicating the quantities of oil to be dispensed. The transparent oil bottle comprises an ordinary glass fruit jar of standard capacity provided with a metal screw cap having a central discharge spout secured thereto. Both of these types of oil dispensers are objectionable to the purchasing public for several reasons. In the first place, they are not readily emptied to insure discharge of their entire contents and to prevent a considerable quantity of the lubricant from adhering to the container walls and bottom; and secondly, they can be readily under-filled so as to deprive the purchaser from receiving the full measure of oil which is being called for. The metal measure is also difficult to fill accurately, while the transparent bottle cannot be rapidly emptied. The metal can type moreover affords no clear view of the interior of the receptacle, and therefore may collect sediment and impurities upon the walls and bottom thereof, thus making these prior dispensers extremely unsatisfactory both to the purchaser and the seller, because of their inaccuracy and of the delay occasioned by their use.

It is a more specific object of the present invention to provide an improved oil measuring and dispensing unit which eliminates all of the objectionable features of the prior devices of this type.

Another specific object of the invention is to provide a liquid dispenser which will accurately measure a predetermined quantity of oil, and from which the measured quantity may be rapidly and effectively delivered.

A further specific object of the invention is to provide an oil dispensing device which may be quickly filled to any desired extent without attention or waste, and wherein the condition of the interior of the measuring chamber is constantly visible.

Still another specific object of the invention is to provide a dispensing unit which may be conveniently handled and inspected, and which may be positively sealed so as to accurately deliver the quantity of oil which it is intended to dispense in order to fully comply with the weight and measure specifications or statutes of the various states and nations.

Another specific object of the invention is to provide an oil dispensing receptacle which will function with the same rapidity and efficiency irrespective of temperature conditions and changes, and which may be effectively utilized for the dispensing of various grades of oil.

A further specific object of the invention is to provide liquid dispensing apparatus which can be manipulated by a novice, and which may be utilized to effectively cooperate with standard oil storage tanks and pumps.

Still another specific object of the invention is to provide a neat appearing and compact oil dispensing unit, a series of which may be maintained loaded with batches of lubricant ready for rapid dispensation, and wherein the measured quantities are protected against undesirable exposure.

Another specific object of the invention is to provide an improved oil dispensing device wherein the oil is discharged by positive displacement, and in which the displacement means is constantly urged and automatically returned to liquid receiving position.

A further specific object of the invention is to provide various improvements in the details of construction of oil measuring and dispensing appliances, whereby the cost of manufacture thereof is reduced to a minimum, while the utility is enhanced to a maximum.

These and other objects and advantages will be apparent from the following detailed description.

A clear conception of an embodiment of the invention and of the mode of constructing and of manipulating oil dispensing devices built in accordance therewith, may be had by referring to the drawing accompanying and forming a part of this specification in which like reference characters designate the same or similar parts in the various views:

Fig. 1 is a full side view of the oil dispensing device, showing the displacement plunger partially elevated;

Fig. 2 is a part sectional end view of the device, looking toward the plunger actuating end, and the section being taken transversely through the plunger actuating rod and spring of Fig. 1;

Fig. 3 is an opposite end view of the device, looking toward the filling and discharge spout end;

Fig. 4 is a central longitudinal section through the plunger actuating end of the device, the section being taken along the line 4—4 of Fig. 2;

Fig. 5 is a central longitudinal section through the spout end of the device, the section being taken along the line 5—5 of Fig. 3; and Fig. 6 is a diagrammatic view showing the mode of filling the improved dispensing device.

The improved lubricating oil dispensing device specifically illustrated in the drawing comprises in general a transparent tube or cylinder 8; end heads 9, 10 rigidly attached to the opposite ends of the cylinder 8; a displacement plunger 11 movable within the cylinder 8 between the end heads 9, 10; an actuating handle 12 secured to the plunger 11 by means of a plunger rod 13; and a coiled spring 14 surrounding the rod 13 and coacting with the end head 9 and with the handle 12 to constantly urge the plunger 11 toward the head 9.

The cylinder 8 may be formed either of unbreakable transparent material, or of glass, and should be accurately bored or ground. The end heads 9, 10 are grooved to receive the ends of the cylinder 8, and sealing rings 15 or the like may be interposed between the cylinder ends and the heads, so as to seal the joints against leakage. The clamping of the end heads 9, 10 against the ends of the cylinder 8, is effected by a series of solid rods 16 and a tubular handle rod 17, and nuts 18 coacting therewith.

The end head 10 is provided with a spout 19 having a liquid dispensing opening in open communication with the interior of the cylinder 8, and also has a vent valve 20 associated therewith remote from the spout 19. The valve 20 is constantly urged toward closed position by a spring 21, and is movable toward open position by application of pressure to a knob 22 at the outer end of the valve stem. The vent valve 20 is adapted to enter a recess 23 in the head 10, when closing, so that the face of the valve which is exposed to the interior of the cylinder 8, will lie flush with the inner surface of the head 10, when the valve 20 is fully closed.

The end head 9 is provided with a central bore through which the plunger rod 13 is slidable, and also has an adjustable limit stop 24 associated therewith. The inner end of the stop 24 projects within the cylinder 8 and is adapted to coact with the plunger 11 so as to limit the movement of the plunger away from the head 10, by the spring 14. The stop 24 may be locked in adjusted position by means of a lock nut 25, and this lock nut 25 as well as the nuts 18 coacting with the clamping rods 16, may be positively sealed against displacement, by wires 26 penetrating these nuts and having metal seals 27 applied thereto as clearly shown in Figs. 2 and 3.

The displacement plunger 11 comprises a pair of disks 28, 29 having a cup leather packing 30 clamped therebetween and snugly fitting the bore of the cylinder 8. The cylindrical portion of the packing 30 surrounds the disk 28 but does not extend beyond the exposed face of this disk, so that the disk 28 may be brought into surface coaction with the adjacent inner surface of the head 10. The plunger rod 13 may be rigidly attached to the plunger 11 and handle 12, in any suitable manner, and the spring 14 may be retained central with respect to the rod 13 by bosses formed on the head 9 and handle 12 respectively.

As previously indicated, the spring 14 tends to constantly urge and maintain the plunger 11 against the stop 24, and the spring 21 likewise tends to close the vent valve 20. When it is desired to fill the dispensing device with oil from a drum or tank 31, the unit may be placed upon the swinging bracket 32 of the supply tank in the manner illustrated in Fig. 6. The dispensing unit thus inverted may have its spout 19 brought into coaction with the outlet end of the dispensing pipe 33 of the tank 31, and a spring 34 may be utilized to urge the bracket 32 upwardly to clamp the unit in position between the supporting bracket and the overhanging end of the pipe 33. The pump 35 may then be operated to introduce oil from the tank 31 into the cylinder 8, while the operator presses the vent valve actuating knob 22, and the filling operation will continue until the vent valve 20 is closed. Successive dispensing units may obviously be filled in like manner, and the filled units may then be set upon a rack preparatory to subsequent dispensing of the measured batches.

In order to empty a filled or partially filled dispensing unit, it is only necessary to invert the same and to simultaneously properly direct the spout 19 thereof. By subsequently applying pressure to the handle 12 while holding the cylinder 8 with the aid of the handle rod 17, the plunger 11 will be moved downwardly to cause rapid and complete displacement of the cylinder contents. The periphery of the packing 30 during such movement of the plunger 11, scrapes the inner cylinder wall entirely free of oil, and when the exposed surface of the plunger disk 28 is pressed in contact with the inner surface of the head 10, substantially the entire charge of oil will have been delivered through the spout 19. Subsequent release of the handle 12 will cause the spring 14 to quickly withdraw the plunger 11 and to bring the disk 29 thereof against the limit stop 24.

During such filling and discharging of the cylinder 8, the internal conditions are constantly visible through the transparent cylinder wall, so that an operator may readily see when the device has been filled sufficiently, whereas the purchaser may also observe whether all of the oil has been delivered. By placing the spring 14 externally of the cylinder 8, it is possible to utilize a cylinder of minimum length, and accumulation of material within the unit is also avoided. The plunger 11 and vent valve 20 are conveniently manipulable by the operator, and the stop 24 may be readily adjusted after complete assembly of each unit, so as to accurately fix the capacity thereof. By applying the sealing wires 26 and seals 27, after such final adjustment of the stop 24, the volumetric capacity of the unit cannot be changed. The packing 30 and the formation of the head 10 and plunger 11, insure complete delivery of the entire measured batches, irrespective of varying temperature conditions or of variations in the grade of oil, and the improved device has proven highly efficient in actual operation.

It should be understood that it is not desired to limit the invention to the exact details of construction herein shown and described, for various modifications within the scope of the claims may occur to persons skilled in the art.

It is claimed and desired to secure by Letters Patent:

1. An oil dispenser comprising, a transparent cylinder having end heads one of which is provided with a filling and discharge opening, a plunger movable within said cylinder toward and away from said opening, adjustable means for limiting the travel of said plunger away from said opening, and means for sealing said adjustable means in an adjusted position.

2. An oil dispenser comprising, a transparent cylinder having end heads one of which is provided with a dispensing opening, a plunger movable within said cylinder between said heads, a vent associated directly with said head having said opening and communicable during filling directly with the highest portion of the space within said cylinder between said plunger and said opening, and an adjustable stop for said plunger associated with the other of said heads.

3. An oil dispenser comprising, a cylinder having end heads one of which is provided with a dispensing opening, a plunger movable within said cylinder between said heads, an adjustable stop for limiting the movement of said plunger away from said opening sealing means coacting with said stop to prevent adjustment thereof, and resilient means disposed outside of said cylinder for urging said plunger toward said stop.

4. An oil dispenser comprising, a cylinder having end heads one of which is provided with a dispensing opening, a plunger movable within said cylinder between said heads, a vent associated with one of said heads adjacent to said opening, an adjustable stop associated with the other of said heads for limiting the movement of said plunger away from said opening, and resilient means for urging said plunger away from said opening and toward said stop.

5. An oil dispenser comprising, a transparent cylinder, end heads coacting with the opposite ends of said cylinder, clamping rods connecting said end heads, a plunger movable within said cylinder between said heads, and sealing means associated with said rods for preventing access to said plunger by removal of said heads.

6. An oil dispenser comprising, a transparent cylinder, end heads coacting with the opposite ends of said cylinder, clamping rods connecting said end heads, a plunger movable within said cylinder between said heads, an adjustable stop associated with one of said heads for limiting the movement of said plunger, and sealing means coacting with said stop and with said rods for preventing adjustment of said stop.

7. An oil dispenser comprising, a cylinder having a dispensing opening, a plunger movable within said cylinder toward and away from said opening, an adjustable stop for limiting the movement of said plunger away from said opening, and sealing means coacting with a portion of said cylinder for preventing adjustment of said stop.

8. An oil dispenser comprising, a cylinder having a dispensing opening at one end thereof, a manually operable venting valve disposed near said opening, and a plunger movable toward and away from said opening, said valve being flush with the end of said plunger when the latter is disposed nearest said opening.

9. An oil dispenser comprising, a cylinder, end heads coacting with said cylinder, clamping rods connecting said heads, one of said heads being provided with a dispensing opening, a plunger movable within said cylinder toward and away from said opening, an adjustable stop for said plunger associated with one of said heads, a rod for said plunger extending externally of said cylinder, and resilient means associated with said rod for constantly urging said plunger away from said opening and toward said stop.

10. An oil dispenser comprising, a cylinder, an end head coacting with one end of said cylinder and having a dispensing opening and a vent, another end head coacting with the opposite end of said cylinder and having an adjustable stop, clamping rods connecting said heads, one of said rods forming a handle for supporting said cylinder, a plunger movable within said cylinder between said opening and said stop, means for moving said plunger from the exterior of said cylinder, and resilient means coacting directly with said moving means for constantly urging said plunger away from said opening and toward said stop.

11. An oil dispenser comprising, a cylinder, end heads detachably associated with the opposite ends of said cylinder, means for sealing said heads against disassociation from said cylinder, one of said heads having a dispensing opening and a vent, an adjustable stop associated with the other of said heads, means for sealing said stop in an adjusted position, and a plunger movable within said cylinder between said opening and said stop.

In testimony whereof, I affix my signature.

PAUL A. MASKE.